(12) United States Patent
Okinaka et al.

(10) Patent No.: US 9,422,913 B2
(45) Date of Patent: Aug. 23, 2016

(54) CERAMIC GLOW PLUG EQUIPPED WITH PRESSURE SENSOR

(71) Applicant: NGK SPARK PLUG CO., LTD., Nagoya-shi, Aichi (JP)

(72) Inventors: Manabu Okinaka, Kani (JP); Yoshihiro Yamamoto, Kitanagoya (JP); Hiroyuki Suzuki, Kasugai (JP); Akimitsu Sassa, Toukai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/368,577

(22) PCT Filed: Dec. 25, 2012

(86) PCT No.: PCT/JP2012/008286
§ 371 (c)(1),
(2) Date: Jun. 25, 2014

(87) PCT Pub. No.: WO2013/099226
PCT Pub. Date: Jul. 4, 2013

(65) Prior Publication Data
US 2014/0352640 A1 Dec. 4, 2014

(30) Foreign Application Priority Data

Dec. 26, 2011 (JP) ................................ 2011-282577

(51) Int. Cl.
*F23Q 7/00* (2006.01)
*F02P 19/02* (2006.01)
(Continued)

(52) U.S. Cl.
CPC ............. *F02P 19/028* (2013.01); *F23Q 7/001* (2013.01); *G01L 19/00* (2013.01); *G01M 15/08* (2013.01); *F23Q 2007/002* (2013.01)

(58) Field of Classification Search
CPC .................... F23Q 2007/002; F02P 19/028
USPC ...................................................... 123/145 A
See application file for complete search history.

(56) References Cited

U.S. PATENT DOCUMENTS

| 4,475,030 A * | 10/1984 | Bailey | ............... F23Q 7/001 |
| | | | 123/145 A |
| 6,539,787 B1 * | 4/2003 | Murai | ............... F02D 35/023 |
| | | | 73/114.21 |

(Continued)

FOREIGN PATENT DOCUMENTS

| DE | 102004044727 A1 | 3/2006 |
| EP | 1734304 A1 | 12/2006 |

(Continued)

OTHER PUBLICATIONS

International Search Report, dated Mar. 26, 2013, issued by the International Searching Authority in counterpart International Application No. PCT/JP2012/008286.

(Continued)

*Primary Examiner* — Marguerite McMahon
*Assistant Examiner* — James Kim
(74) *Attorney, Agent, or Firm* — Sughrue Mion, PLLC

(57) ABSTRACT

A ceramic glow plug equipped with a pressure sensor including a ceramic heater, a holding device, a housing sleeve, a housing, a movable member and a pressure sensor. A heat-generating main portion P whose resistance is 75% of the total resistance of the ceramic heater is located forward of the forward end of the holding sleeve.

5 Claims, 7 Drawing Sheets

(51) Int. Cl.
*G01L 19/00* (2006.01)
*G01M 15/08* (2006.01)

(56) References Cited

U.S. PATENT DOCUMENTS

| | | | |
|---|---|---|---|
| 7,228,730 B2* | 6/2007 | Haussner | F23Q 7/001 73/114.19 |
| 7,624,620 B2* | 12/2009 | Hirose | F23Q 7/001 73/35.12 |
| 8,378,273 B2* | 2/2013 | Sekiguchi | H05B 3/141 219/270 |
| 2001/0008090 A1* | 7/2001 | Murai | G01L 23/10 73/756 |
| 2007/0209624 A1* | 9/2007 | Ludwig | G01L 23/10 123/145 A |
| 2007/0210053 A1* | 9/2007 | Hotta | F23Q 7/001 219/270 |
| 2007/0245806 A1* | 10/2007 | Hirose et al. | 73/35.13 |
| 2007/0289370 A1 | 12/2007 | Hirose et al. | |
| 2007/0295710 A1* | 12/2007 | Yamada | F23Q 7/001 219/270 |
| 2008/0302776 A1 | 12/2008 | Arima et al. | |
| 2009/0056660 A1* | 3/2009 | Goto | F23Q 7/001 123/145 A |
| 2009/0126472 A1* | 5/2009 | Hirose | G01L 23/22 73/114.18 |

FOREIGN PATENT DOCUMENTS

| | | |
|---|---|---|
| JP | 2004-61041 A | 2/2004 |
| JP | 2005-300046 A | 10/2005 |
| JP | 2006-337020 A | 12/2006 |
| JP | 2008-2809 A | 1/2008 |
| JP | 2010-73422 A | 4/2010 |
| JP | 2011-33318 A | 2/2011 |
| JP | 2011-89688 A | 5/2011 |
| WO | 2005/117492 A1 | 12/2005 |

OTHER PUBLICATIONS

Communication issued on Jul. 15, 2015 by the European Patent Office in related Application No. 12863258.5.

* cited by examiner

US 9,422,913 B2

CERAMIC GLOW PLUG EQUIPPED WITH PRESSURE SENSOR

TECHNICAL FIELD

The present invention relates to a ceramic glow plug having a ceramic heater for use in assisting combustion of a diesel engine or performing a like operation, and more particularly to a ceramic glow plug having a built-in pressure sensor capable of measuring a combustion pressure of the engine.

BACKGROUND ART

Conventionally, there is known a ceramic glow plug having a ceramic heater (hereinafter, may be referred to as a heater) which uses electrically insulating ceramic as a substrate and in which a resistance heat-generating element formed of a resistor or electrically conductive ceramic is embedded in the substrate or is provided on the outer surface (particularly, on the outer surface of a portion located toward the forward end) of the substrate. Even in use at such a high temperature that, for example, the surface temperature of the forward end of the heater becomes 1,350° C., in contrast to a metal glow plug having a resistance wire coil, the ceramic glow plug has low risk of occurrence of disconnection. Thus, conceivably, the ceramic glow plug is used while heat is generated at a relatively high temperature. Such a ceramic glow plug is configured such that the heater is held, at its outer circumference, by a tubular holding sleeve made of metal. The holding sleeve holds the heater and also establishes electrical connection through connection with an electrode lead-out portion of the heater adapted to supply electricity to a resistance heat-generating element of the heater (refer to, for example, Patent Document 1).

In recent years, emphasis has been placed on accurate grasping of the condition of combustion in order to control combustion with subtlety for the purpose of improving fuel economy and cleaning exhaust gas. In order to utilize a glow plug having a heater exposed to a combustion chamber for observing variation in pressure in the combustion chamber, there is provided a glow plug equipped with a pressure sensor having a built-in combustion pressure sensor (refer to, for example, Patent Document 2). In order to allow the heater exposed to the combustion chamber to move rearward in relation to a housing as a result of reception of combustion pressure, such a glow plug equipped with a pressure sensor has a movable member in the form of bellows or a diaphragm which serves as a seal and elastically holds the heater for allowing movement of the heater. The movable member is configured to be able to establish airtightness in order to prevent entry of combustion gas into the glow plug from the combustion chamber. Furthermore, in order to allow relative movement of the heater according to variation in combustion pressure, the movable member is formed by bending a steel sheet having a thickness of about 0.15 mm.

PRIOR ART DOCUMENTS

Patent Documents

Patent Document 1: Japanese Patent Application Laid-Open (kokai) No. 2011-33318
Patent Document 2: Japanese Patent Application Laid-Open (kokai) No. 2008-2809

SUMMARY OF THE INVENTION

Problem to be Solved by the Invention

Meanwhile, in the ceramic glow plug as described in Patent Document 1, heat generated by the heater and a portion of heat received from combustion gas are transferred from the glow plug to an engine head. A path of the heat transfer (heat transfer path) starts from the heater and extends to the engine head via the holding sleeve and via the housing firmly connected to the holding sleeve by welding, brazing, pressure-fitting, etc.

However, in the glow plug equipped with a pressure sensor as described in Patent Document 2, as mentioned above, the heater and the housing are connected by the relatively thin movable member such as bellows, a diaphragm, or the like. Since the movable member transfers a relatively small quantity of heat, the heat transfer path which extends, via the movable member, to the housing and then to the engine head is extremely limited in heat transfer as compared with the ceramic glow plug as described in Patent Document 1. As a result, a joint part between the movable member and a portion to which the movable member is attached is susceptible to heat, potentially resulting in a deterioration in joining strength therebetween.

The present invention has been conceived in view of such actual situation, and an object of the invention is to provide a ceramic glow plug equipped with a pressure sensor configured such that, despite employment of a movable member transferring a small quantity of heat, deterioration in joining strength at a joint part between the movable member and a portion to which the movable member is attached is avoided, and good heat generation can be maintained over a long period of time.

Means for Solving the Problem

To achieve the above object, the present invention provides a glow plug equipped with a pressure sensor comprising:

a ceramic heater extending in an axial direction and having a columnar substrate formed of electrically insulating ceramic, a resistance heat-generating element integrated with the substrate and performing resistance heat generation through application of electricity thereto, and an electrode lead-out portion electrically connected to the resistance heat-generating element and formed at a rear end portion of the resistance heat-generating element in such a manner as to be exposed at an outer surface of the substrate;

a holding sleeve made of metal, connected directly or indirectly to the electrode lead-out portion, and holding the ceramic heater while allowing a forward portion of the ceramic heater to protrude therefrom;

a housing having a tubular form and accommodating therein the ceramic heater and the holding sleeve;

a movable member formed of a metal sheet, joined to the holding sleeve and the housing to airtightly separate a forward side and a rear side thereof, and being elastically deformable in response to combustion pressure; and a pressure sensor disposed rearward of the ceramic heater, the holding sleeve, and the movable member and in the interior of the housing and adapted to detect pressure applied thereto;

the glow plug being characterized in that a heat-generating main portion is located forward of the holding sleeve, where the heat-generating main portion is a forward end portion of the ceramic heater which encompasses a forward end of the ceramic heater and whose resistance accounts for 75% of a total resistance of the ceramic heater.

Regarding connection between the electrode lead-out portion and the holding sleeve, the expression "connected directly or indirectly" means an electrically conductive condition established through direct contact by press fit or any of various kinds of fitting, or an electrically conductively connected condition established through a thin metal film or a brazing material. Therefore, the expression does not mean, for example, an electrically connected condition established by connection to an electric lead connected.

The "heat-generating main portion" is a portion of the ceramic heater whose resistance accounts for 75% of the total resistance of an electrically conductive path in the ceramic heater. The resistance of the heat-generating main portion is measured by the following method. When the ceramic heater is at room temperature, an electric resistor is brought in contact with the electrode lead-out portion of the ceramic heater to measure resistance of the electrically conductive path (corresponding to the total resistance of the electrically conductive path in the ceramic heater). Subsequently, the ceramic heater is cut in a direction perpendicular to the longitudinal direction; then, the electric resistor is brought into contact with the electrically conductive path exposed from a cut surface to measure resistance of the electrically conductive path (hereinafter, referred to as partial resistance). Then, the percentage of a partial resistance to the total resistance is calculated. A portion of the ceramic heater located forward of a position where the calculated value is 75% is defined as the heat-generating main portion.

In addition to the above configuration, according to a ceramic glow plug equipped with a pressure sensor of claim 2, preferably, a joint part between the holding member and the movable member is located in the interior of the metallic shell.

In addition to the above configuration, according to a ceramic glow plug equipped with a pressure sensor of claim 3, preferably, the heat-generating resistor in the heat-generating main portion has a specific resistance which is 90% to 110% of that of the heat-generating resistor in a portion other than the heat-generating main portion, and the heat-generating resistor in the heat-generating main portion is smaller in cross-sectional area than the heat-generating resistor in a portion other than the heat-generating main portion.

The cross-sectional area of the heat-generating resistor in the heat-generating main portion and the cross-sectional area of the heat-generating resistor in a rear portion indicate the areas of the heat-generating resistors exposed at cut surfaces of the heat-generating main portion and the rear portion, respectively, which are cut in a direction perpendicular to the longitudinal direction. Also, the specific resistance of the heat-generating resistor in the heat-generating main portion is a value obtained by dividing the resistance of the heat-generating resistor disposed in the heat-generating main portion by the volume of the heat-generating resistor disposed in the heat-generating main portion. The specific resistance of the heat-generating resistor in the rear portion is a value obtained by dividing the resistance of the heat-generating resistor disposed in the rear portion by the volume of the heat-generating resistor disposed in the rear portion.

In addition to the above configuration, according to a ceramic glow plug equipped with a pressure sensor of claim 4, preferably, the cross-sectional area of the heat-generating resistor in the heat-generating main portion is 90% to 110% of the cross-sectional area of the heat-generating resistor in a portion other than the heat-generating main portion, and the heat-generating resistor in the heat-generating main portion is greater in specific resistance than the heat-generating resistor in a portion other than the heat-generating main portion.

In addition to the above configuration, according to a ceramic glow plug equipped with a pressure sensor of claim 5, preferably, the heat-generating main portion is shorter in axial length than a heat-generating sub portion, where the heat-generating sub portion is a portion of the resistor extending further rearward from a rear end of the heat-generating main portion, and the sum of the resistance of the heat-generating sub portion and the resistance of the heat-generating main portion is 80% of the total resistance, and the joint part between the holding sleeve and the movable member is located rearward of the heat-generating sub portion.

The "heat-generating sub portion" is a portion whose resistance plus the resistance of the heat-generating main portion accounts for 80% of the total resistance. When the ceramic heater is at room temperature, an electric resistor is brought in contact with the electrode lead-out portion of the ceramic heater to measure resistance of the electrically conductive path (corresponding to the total resistance of the electrically conductive path in the ceramic heater). Subsequently, the ceramic heater is cut in a direction perpendicular to the longitudinal direction; then, the electric resistor is brought into contact with the electrically conductive path exposed from a cut surface to measure resistance of the electrically conductive path (hereinafter, referred to as partial resistance). Then, the percentage of a partial resistance to the total resistance is calculated. A portion where the calculated value is 75% to 80% is defined as the heat-generating sub portion.

In addition to the above configuration, according to a ceramic glow plug equipped with a pressure sensor of claim 6, preferably, the electrically insulating ceramic or the resistance heat-generating element has a thermal conductivity of 15 W/m° C. or more at 1,350° C., and an axially shortest distance from a forward end of the heat-generating main portion to the joint part between the holding sleeve and the movable member is 24 mm or more.

Effects of the Invention

In the present invention, the heat-generating main portion whose resistance accounts for 75% of the total resistance of the electrically conductive path in the ceramic heater and which encompasses the forward end of the ceramic heater is located forward of the holding sleeve. That is, the heat-generating main portion is intensively formed at a forward end portion of the ceramic heater and can generate heat efficiently at relatively high temperature. Furthermore, since the heat-generating main portion is disposed forward of the holding sleeve, heat propagating rearward from the heat-generating main portion can be radiated from the ceramic heater to an engine head and a plug hole in the course of propagation to the joint part between the holding sleeve and the movable member. Thus, the influence of heat on the joint part between the holding sleeve and the movable member can be reduced, whereby deterioration in joining strength can be restrained. As a result, there can be restrained damage to the ability to function as a pressure sensor resulting from deterioration in airtightness with respect to combustion gas.

According to the ceramic glow plug equipped with a pressure sensor of claim 2, while the heat-generating main portion is disposed forward of the holding sleeve, the joint part is disposed in the interior of the metallic shell, whereby the longitudinal distance between the heat-generating main portion and the joint part is increased, and the metallic shell surrounds a portion of the ceramic heater located between the heat-generating main portion and the joint part; thus, heat propagating rearward from the heat-generating main portion can be further radiated from the ceramic heater to the engine head and the plug hole in the course of propagation to the joint part. Thus, the influence of heat on the joint part between the holding sleeve and the movable member can be further reduced, whereby deterioration in joining strength can be further restrained. As a result, there can be restrained damage to the ability to function as a pressure sensor resulting from deterioration in airtightness with respect to combustion gas.

According to the ceramic glow plug equipped with a pressure sensor of claim 3, while the heat-generating resistor in the heat-generating main portion and the heat-generating resistor in a portion (hereinafter, referred to as a rear portion) other than the heat-generating main portion have substantially uniform specific resistance, the heat-generating resistor in the heat-generating main portion is smaller in cross-sectional area than the heat-generating resistor in the rear portion, whereby the heat-generating main portion whose resistance accounts for 75% of the total resistance of the electrically conductive path in the ceramic heater can be positioned forward of the holding sleeve.

According to the ceramic glow plug equipped with a pressure sensor of claim 4, while the heat-generating resistor in the heat-generating main portion and the heat-generating resistor in a portion (hereinafter, referred to as a rear portion) other than the heat-generating main portion have substantially uniform cross-sectional area, the heat-generating resistor in the heat-generating main portion is greater in specific resistance than the heat-generating resistor in the rear portion, whereby the heat-generating main portion whose resistance accounts for 75% of the total resistance of the electrically conductive path in the ceramic heater can be positioned forward of the holding sleeve.

According to the ceramic glow plug equipped with a pressure sensor of claim 5, the heat-generating sub portion is provided such that resistance thereof plus resistance of the heat-generating main portion accounts for 80% of the total resistance of the electrically conductive path in the ceramic heater, and the heat-generating sub portion is longer in axial length than the heat-generating main portion. Therefore, heat propagating rearward from the heat-generating main portion can be radiated from the heat-generating sub portion to the engine head and the plug hole in the course of propagation via the heat-generating sub portion. As a result, the rear portion of the ceramic heater can be lower in temperature than the heat-generating sub portion of the ceramic heater. On the premise of such a configuration, the joint part between the movable member and the holding sleeve, which radially holds the ceramic heater, is positioned rearward of the heat-generating sub portion. Thus, the influence of heat on the joint part between the holding sleeve and the movable member can be reduced, whereby deterioration in joining strength can be restrained. As a result, there can be restrained damage to the ability to function as a pressure sensor resulting from deterioration in airtightness with respect to combustion gas.

According to the ceramic glow plug equipped with a pressure sensor of claim 6, the electrically insulating ceramic used to form the substrate, or the resistance heat-generating element has a thermal conductivity of 15 W/m° C. or more at 1,350° C.; thus, there is facilitated propagation of heat from a forward end portion (specifically, the heat-generating main portion) of the ceramic heater to a rear end portion (a portion corresponding to the joint part) of the ceramic heater; however, since the axially shortest distance from the forward end of the heat-generating main portion to the joint part is 24 mm or more, the heat-generating sub portion can have a relatively long axial length. Therefore, heat propagating rearward from the heat-generating main portion can be effectively radiated to the engine head and the plug hole in the course of propagation via the heat-generating sub portion. As a result, a portion of the ceramic heater located rearward of the heat-generating sub portion can be further reduced in temperature, whereby there can be further restrained deterioration in joining strength at the joint part between the holding sleeve and the movable member. In the case of a longitudinally elongated joint part, the axially shortest distance is a distance between the forward end of the joint part and the forward end of the heat-generating main portion.

MODES FOR CARRYING OUT THE INVENTION

Figure 1:
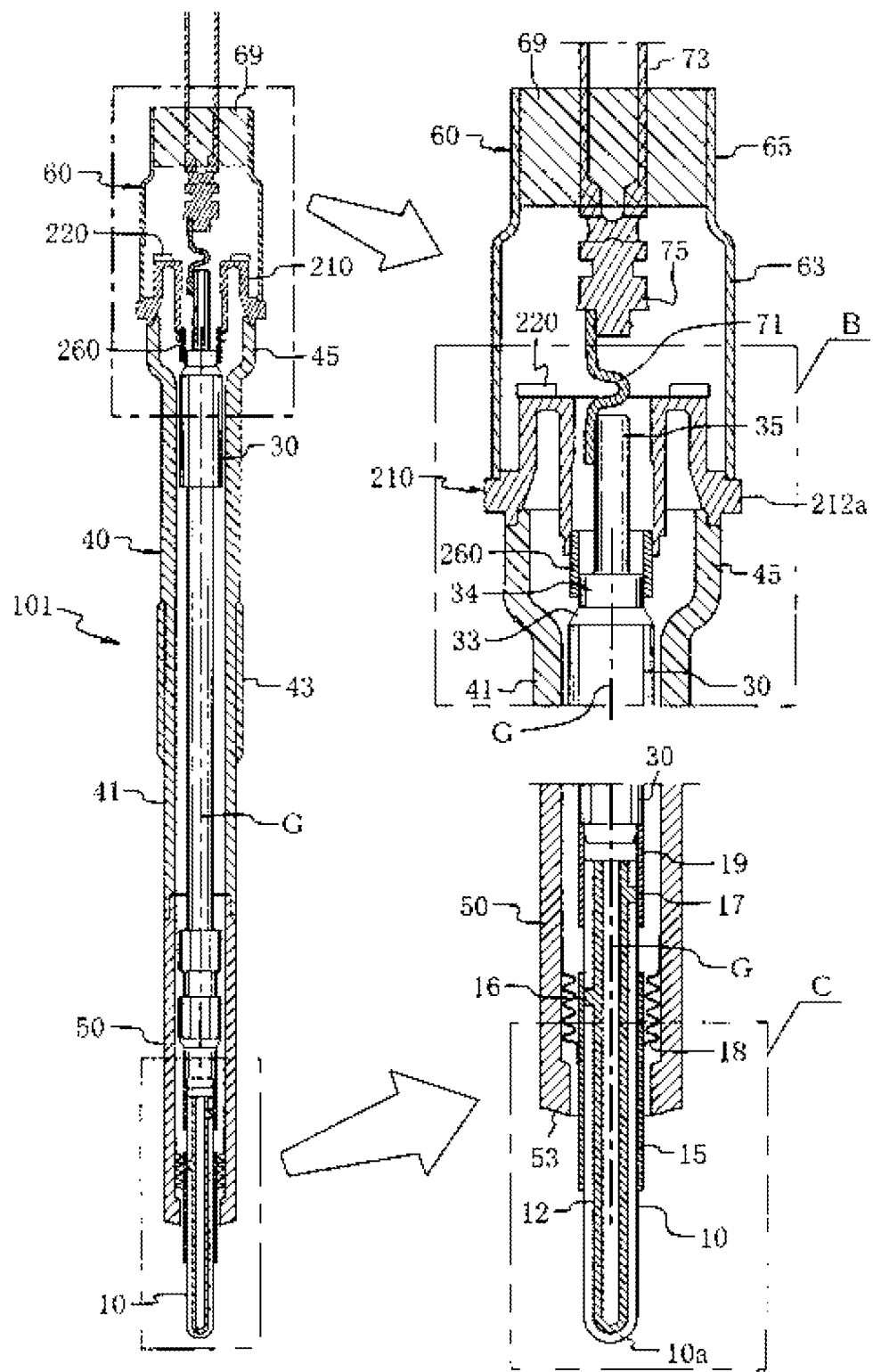
FIG. 1 Longitudinal sectional view of a glow plug equipped with a pressure sensor according to an embodiment (first embodiment) of the present invention and enlarged views of forward and rearward end portions of the glow plug.

A glow plug equipped with a pressure sensor according to a first embodiment of the present invention will next be described with reference to FIG. 1. A glow plug 101 of the present embodiment includes a substantially cylindrical housing 40 made of metal, a ceramic heater 10 which is located on the inside of the housing 40 and whose forward end (a lower end in FIG. 1) 10a protrudes from a forward end 53 of a forward end housing 50, a center shaft 30 disposed within the housing 40 in such a manner as to extend rearward from the rear end of the ceramic heater 10 and adapted to apply voltage, and a distortion member 210 provided between the outer circumferential surface of a rear end portion of the center shaft 30 and the inner circumferential surface of the housing 40 and partially constituting a combustion pressure sensor.

In the present embodiment, the housing 40 includes a substantially cylindrical housing body 41 formed of, for example, SUS303, and the forward end housing 50 fitted and welded to a forward end of the housing body 41 in a coaxially butted condition. The ceramic heater 10 has a circular columnar form and is disposed coaxially with an axial line G of the forward end housing 50 such that the forward end 10a protrudes from the forward end 53 of the forward end housing 50. The ceramic heater 10 has a resistance heat-generating element (electrically conductive ceramic) 12 which is disposed in a ceramic substrate 11 (corresponding to a substrate appearing in claims) in such a manner as to be folded (U-shaped) at the forward end 10a and which has electrode lead-out portions 16 and 17 adapted to apply electricity and exposed at the side surface of a rear end portion of the ceramic heater 10. A holding sleeve 15 made of metal such as SUS630 is externally press-fitted to an intermediate portion of the ceramic heater 10 and is electrically connected, at the inner circumferential surface of its rear end portion, to the grounding electrode lead-out portion 16 located relatively forward. Bellows 18 (corresponding to a movable member appearing in claims) formed of a heat resisting Ni alloy such as INCONEL (registered trademark of INCO Corp.) is externally fitted to the holding sleeve 15 in a loose fit condition. The bellows 18 is of, for example, a membrane having a thickness of 0.07 mm; its rear end portion is welded, in a sealing condition, to the inner circumferential surface of a forward end portion of the forward end housing 50; and its forward end portion is welded, in a sealing condition, to the outer circumferential surface of the holding sleeve 15. The bellows 18 allows a forward-rearward movement (displacement) of the heater 10 in relation to the housing 40, serves as a junctional electrically conductive member between the housing 40 and the grounding electrode lead-out portion 16 of the heater 10, holds the heater 10 within the housing 40, and seals the interior of a forward end portion of the housing 40. The ceramic heater 10 and the bellows 18 will be described in detail later.

The center shaft 30 for application of voltage is coaxially disposed on the rear end of the ceramic heater 10 and is disposed coaxially with the housing 40 in such a manner as to extend rearward while holding electrical insulation (air insulation in the present embodiment) within the housing 40. A connection pipe 19 of metal is externally fitted to a rear end portion of the ceramic heater 10 and to a forward end portion of the center shaft 30 by press fit or the like, and the electrode lead-out portion (positive-potential terminal) 17 located at a relatively rear position of the ceramic heater 10 maintains its electrical continuity through the inner circumferential surface of the connection pipe 19 and is thus electrically connected to the center shaft 30. That is, the connection pipe 19 unites the ceramic heater 10 and the center shaft 30 and ensures electrical continuity therebetween.

In the present embodiment, the housing 40 includes the housing body 41 and the forward end housing 50 and has a thread 43 formed in a predetermined length on the outer circumferential surface of the housing body 41 for threadingly fix the glow plug into a plug hole of an unillustrated engine head. A rear end portion of the housing body 41 assumes the form of an diameter-expanded tubular portion 45 which is expanded in diameter so as to have a relatively large diameter over a predetermined range extending forward from the rear end of the housing body 41, and a sealing protection tube (cap); i.e., a rear end housing 60 having the form of a different-diameter cylinder whose rear end portion is relatively small in diameter, is attached to the rear end of the diameter-expanded tubular portion 45 while the distortion member 210 for a sensor, which will be described later, is nipped at its outer circumferential portion therebetween. The distortion member 210 has an annular form (or a cylindrical form) as a whole and is fixed, at its inner circumferential portion, to a rear end portion of the center shaft 30 via an electrically insulating ring 260, which will be described in detail later.

In the present embodiment, the center shaft 30 is formed partially thick at a portion located toward its forward end and at a portion located toward its rear end. The rear end of the center shaft 30 protrudes rearward from the rear end of the housing body 41 and is positioned in a forward end portion of a large-diameter tubular portion 63 of the rear end sealing protection tube (rear end housing) 60. The center shaft 30 has, at its rear end portion, a taper diameter-reduced portion 33 whose diameter is reduced coaxially in a tapered manner toward its rear end from a position corresponding to a forward end portion of the diameter-expanded tubular portion 45 of the housing body 41, and a parallel diameter-reduced shaft portion 34 whose diameter is further reduced coaxially at the rear end of the taper diameter-reduced portion 33 and which serves as an electrically insulating ring fitting shaft portion. The center shaft 30 further has a small-diameter shaft portion 35 which is located rearward of the parallel diameter-reduced shaft portion (electrically insulating ring fitting shaft portion) 34 and is concentric with and smaller in diameter than the parallel diameter-reduced shaft portion 34. A terminal metal member 75 having a plug terminal 73 protruding rearward into an ambient atmosphere is connected, by welding, to a rear end portion of the center shaft 30; i.e., to a rear end portion of the small-diameter shaft portion 35, via a terminal spring 71 which allows displacement in the forward-rearward direction within the rear end sealing protection tube 60. A seal member 69 formed of, for example, rubber is fitted into a rear end small-diameter portion 65 of the rear end sealing protection tube 60.

Next will be described a structure, among others, in which the distortion member 210, which partially constitutes a sensor for detection of pressure, and the center shaft 30 are fixed together via the electrically insulating ring 260. The distortion member 210 is disposed at the rear end of the housing body 41 in such a manner as to block, with respect to the forward-rearward direction, an annular space between the inside of a rear end portion of the housing body 41 and the outer circumferential portion of a rear end portion of the center shaft 30, and has an annular form (cylindrical form) as a whole. The distortion member 210 is provided so as to be deformed simultaneously with reception of a forward-rearward movement of the ceramic heater 10 by the center shaft 30. Specifically, the distortion member 210 has an annular thick portion 212a at its outer circumference; the annular thick portion 212a is fitted, in a butting condition, to the rear end of the diameter-expanded tubular portion 45 and to the forward end of the sealing protection tube (rear end housing) 60 located rearward of the diameter-expanded tubular portion 45 while being sandwiched between the rear end and the forward end; and each of the butt portions is fixed through laser welding performed along the circumferential direction from outside.

Figure 2:
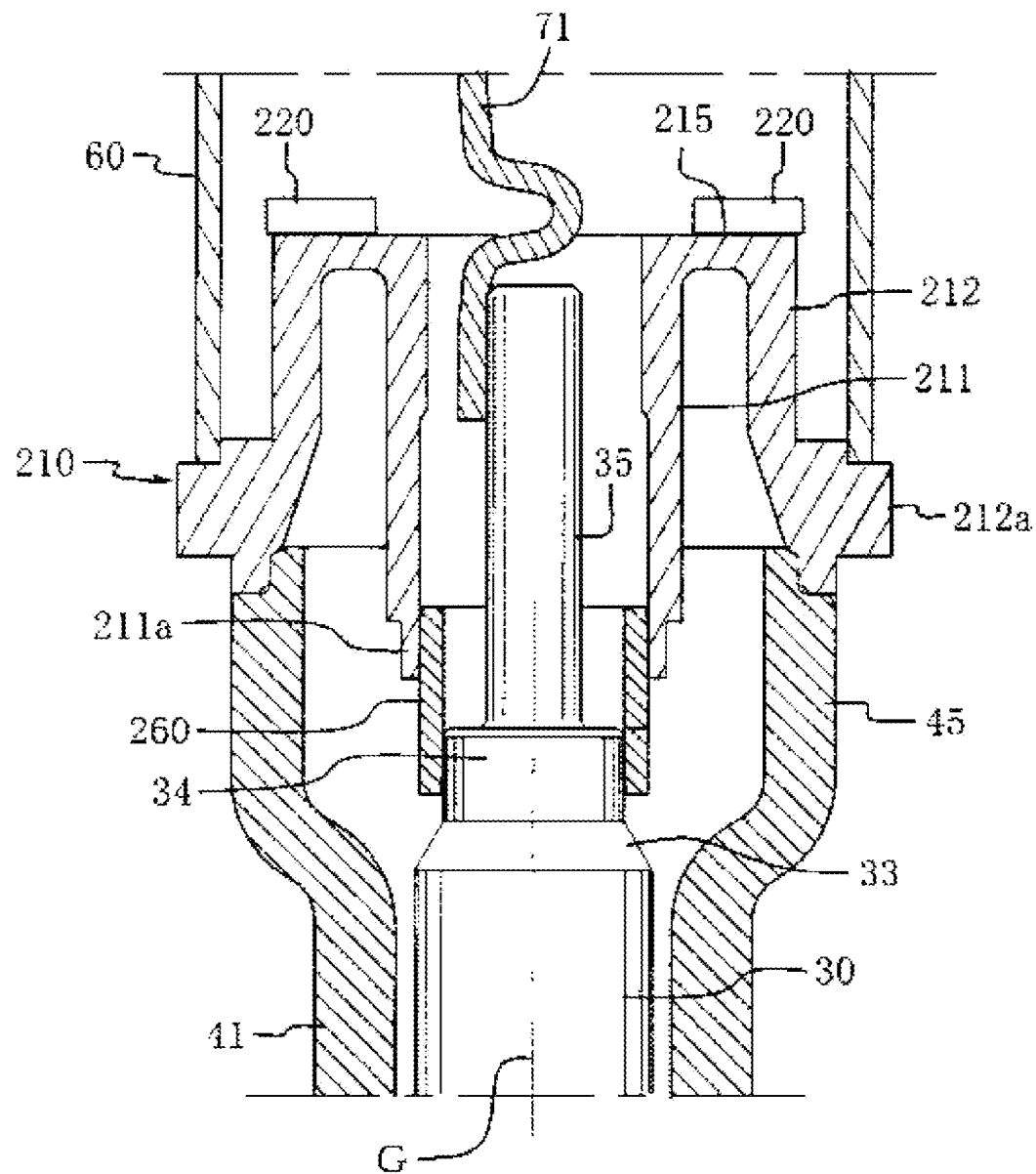
FIG. 2 Enlarged view of region B of the rear end portion of the glow plug equipped with a pressure sensor shown in FIG. 1.

Meanwhile, the distortion member 210 has an outer tubular portion 212 extending rearward (upward in FIG. 2) at the inside of the annular thick portion 212a formed at the outer circumference, and an annular membrane portion (annular diaphragm portion) 215 located at the inside the rear end of the outer tubular portion 212. The distortion member 210 further has an inner tubular portion 211 extending forward at the inside (on a side toward the inner circumference) of the annular membrane portion 215. The inner tubular portion 211 extends forward beyond the position of the annular thick portion 212a formed at the outer circumference, and the outer circumferential surface of the inner tubular portion 211 is reduced in diameter at a forward end portion 211a such that the forward end portion 211a has a relatively small outside diameter, whereby the forward end portion 211a is relatively thin-walled.

Furthermore, an appropriate number of strain sensors (corresponding to a pressure sensor appearing in claims) are attached to, for example, a rearward-oriented surface of the annular membrane portion (annular diaphragm portion) 215 of the distortion member 210, and the strain sensors 220 detect, via a device including an unillustrated circuit, strain on the basis of deformation of the distortion member 210 which is deformed upon reception of a forward-rearward movement of the shaft member 30, and output an electric signal according to the detected strain through unillustrated output lead-out electric wires. Thus, the glow plug 101 of the present embodiment is configured as follows: the heater 10 and the shaft member 30 unitarily move forward or rearward in the direction of the axial line G in response to combustion pressure and thereby deform the distortion member 210, and combustion pressure is detected from the deformation of the distortion member 210 by use of the strain sensors 220.

Next will be described the ceramic heater 10 and the bellows 18, which are essential members of the present invention.

Figure 3:
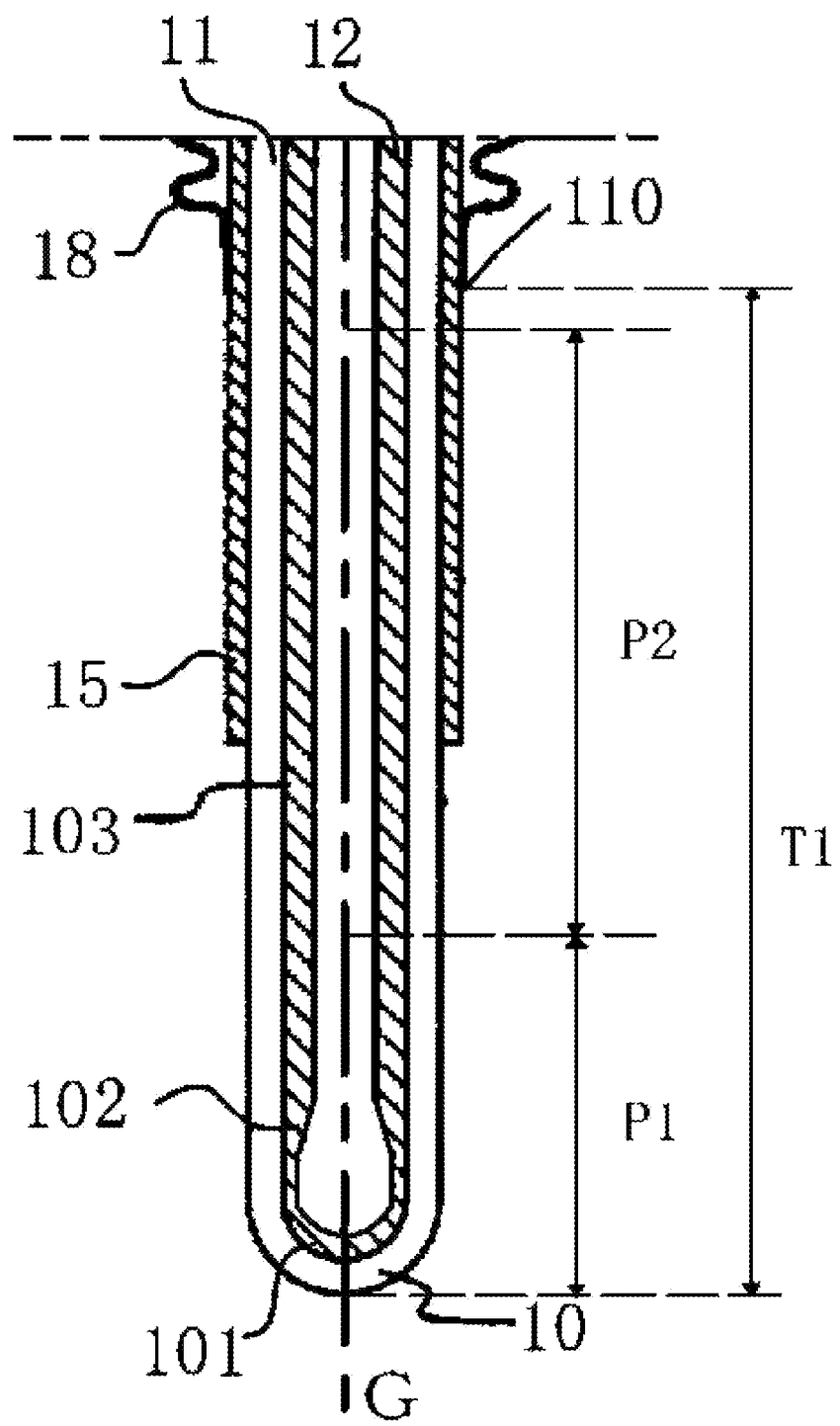
FIG. 3 Enlarged view of region C of the forward end portion of the glow plug equipped with a pressure sensor shown in FIG. 1.

FIG. 3 is an enlarged view of region C shown in FIG. 1; however, for convenience of description, the forward end housing 50 is omitted.

In the present embodiment, the ceramic heater 10 is configured such that the resistance heat-generating element 12 formed of an electrically conductive ceramic of tungsten carbide is disposed in a shape resembling the letter U in the ceramic substrate 11 formed of silicon nitride. Material for the ceramic substrate 11 is not limited to silicon nitride; instead, alumina, sialon, etc., can be used. Also, electrically conductive ceramic used to form the resistance heat-generating element 12 is not limited to tungsten carbide; instead, molybdenum disilicide, tungsten disilicide, etc., can be used. As mentioned above, the resistance heat-generating element 12 has a shape resembling the letter U, and its forward end portion which includes a fold at the forward end (lower end in FIG. 3) corresponding to a bottom portion of the letter U is a small-diameter line portion 101 having a circular cross section of, for example, 0.5 mm. The resistance heat-generating element 12 further has a pair of taper portions 102 whose face-to-face insides are tapered so as to be connected to the small-diameter line portion 101 and in such a manner as to increase rearward in thickness, and a pair of large-diameter line portions 103 connected to the taper portions. The large-diameter line portions 103 are disposed in parallel with each other, are rectilinear, and have the same cross section; for example, a circular cross section (or an elliptic cross section) having a diameter of 0.9 mm. As shown in FIG. 1, the large-diameter line portions 103 have the electrode lead-out portions 16 and 17, respectively, having, for example, a circular columnar shape and formed in a protruding manner.

In consideration of disposing a forward end portion of the ceramic heater 10 in a combustion chamber of an engine for heating the combustion chamber, the ceramic heater 10 is configured such that its forward end portion intensively generates heat at high temperature. Specifically, as shown in FIG. 3, a heat-generating main portion P1 whose resistance (e.g., 300 mΩ) is 75% of the total resistance (e.g., 400 mΩ) of the ceramic heater 10 is intensively disposed at a forward end portion of the ceramic heater 10 (e.g., when the entire ceramic heater 10 is divided into three equal portions from its forward end, the heat-generating main portion P1 is disposed within the forwardmost portion among the three portions). As a result, the heat-generating main portion P1 can be positioned forward of the forward end of the holding sleeve 15. Thus, a forward end portion of the ceramic heater 10 can efficiently and intensively generate heat at high temperature.

A specific method of disposing the heat-generating main portion P1 intensively at a forward end portion is as follows: as mentioned above, the resistance heat-generating element 12 is formed only of electrically conductive ceramic of tungsten carbide, and the resistance heat-generating element 12 is provided with the small-diameter line portion 101 smaller in cross-sectional area than the large-diameter line portions 103, whereby the resistance of a forward end portion of the ceramic heater 10 is further increased.

Furthermore, a heat-generating sub portion P2 is provided in such a manner as to be connected to the heat-generating main portion P1. The heat-generating sub portion P2 is a portion whose resistance plus resistance of the heat-generating main portion P1 is 80% (e.g., 320 mΩ) of the total resistance of the ceramic heater 10. That is, the heat-generating portion P2 is a portion whose resistance is 5% of the total resistance of the ceramic heater 10. By means of the resistance heat-generating element 12 having the large-diameter line portions 103 as mentioned above, the heat-generating sub portion P2 can be a portion whose resistance is 5% of the total resistance of the ceramic heater 10. A rear portion of the heat-generating sub portion P2 is disposed in the interior of the holding sleeve 15.

As shown in FIG. 3, the axial length of the heat-generating sub portion P2 is rendered longer than the axial length of the heat-generating main portion P1. In the present embodiment, the axial length of the heat-generating main portion P1 is 7.5 mm, and the axial length of the heat-generating sub portion P2 is 12.5 mm. By means of the axial length of the heat-generating sub portion P2 being longer than the axial length of the heat-generating main portion P1, in the course of rearward propagation of heat from the heat-generating main portion P1 via the heat-generating sub portion P2, heat can be further radiated from the ceramic heater 10 to an engine head and to a plug hole. As a result, a portion of the ceramic heater 10 located rearward of the heat-generating sub portion P2 can have relatively low temperature.

Furthermore, as mentioned above, the holding sleeve 15 is externally press-fitted to an intermediate portion of the ceramic heater 10, and the bellows 18 made of metal is welded to the holding sleeve 15. Incidentally, since the bellows 18 is of, for example, a membrane having a thickness of 0.07 mm, the quantity of heat transferred through the bellows 18 is relatively small. Thus, the heat transfer path which extends from the ceramic heater 10, via the bellows 18, to the forward end housing 50 and then to the engine head is extremely limited in heat transfer as compared with a glow plug having a conventional structure, potentially resulting in adverse effect on joining strength at a joint part 110. By contrast, in the present embodiment, the joint part 110 between the holding sleeve 15 and the bellows 18 is positioned rearward of the heat-generating sub portion P2. Thus, the influence of heat on the joint part 110 between the holding sleeve 15 and the bellows 18 can be reduced, whereby deterioration in joining strength at the joint part 110 can be restrained. As a result, there can be restrained damage to the ability to function as a pressure sensor resulting from deterioration in airtightness with respect to combustion gas.

Also, in the present embodiment, the joint part 110 is positioned in the interior of the housing 40 (see FIG. 1). In this manner, while the heat-generating main portion P1 is disposed forward of the holding sleeve 15, the joint part 110 is positioned in the interior of the housing 40, whereby the longitudinal distance between the heat-generating main portion P1 and the joint part 110 is increased, and the metallic shell surrounds a portion of the ceramic heater located between the heat-generating main portion and the joint part; thus, heat propagating rearward from the heat-generating main portion P1 can be further radiated from the ceramic heater 10 to the engine head and the plug hole in the course of propagation to the joint part 110. Thus, the influence of heat on the joint part 110 between the holding sleeve 15 and the bellows 18 can be further reduced, whereby deterioration in joining strength can be further restrained. As a result, there can be restrained damage to the ability to function as a pressure sensor resulting from deterioration in airtightness with respect to combustion gas.

Furthermore, in the present embodiment, silicon nitride used to form the ceramic substrate 11 has a thermal conductivity of 17 W/m° C. at 1,350° C., and tungsten carbide used to form the resistance heat-generating element 12 has a thermal conductivity of 22.5 W/m° C. at 1,350° C. In this manner, if the ceramic substrate 11 or the resistance heat-generating element 12 has a thermal conductivity of 15 W/m° C. or more at 1,350° C., there is relatively facilitated propagation of heat from the heat-generating main portion P1 of the ceramic heater 10 to a rear portion where the joint part 110 is provided. In this connection, in the present embodiment, a distance T1 from the forward end of the heat-generating main portion P1 (i.e., the forward end of the ceramic heater 10) to the joint part 110 is 24 mm. Since the axial distance from the forward end of the heat-generating main portion P1 to the joint part 110 is 24 mm or more, the heat-generating sub portion P2 can have a relatively long axial length. Therefore, heat propagating rearward from the heat-generating main portion P1 can be effectively radiated to the engine head and the plug hole in the course of propagation via the heat-generating sub portion P2. As a result, the joint part 110 located rearward of the heat-generating sub portion P2 of the ceramic heater 10 can be further reduced in temperature, whereby deterioration in joining strength at the joint part 110 can be further restrained. Notably, the longer the axial distance from the forward end of the heat-generating main portion P1 to the joint part 110, the more the axial length of the heat-generating sub portion P2 can be increased, whereby heat can be more effectively radiated; however, when the axial distance from the forward end of the heat-generating main portion P1 to the joint part 110 exceeds 40 mm, the temperature raising performance of the glow plug 101 drops; therefore, an axial distance of 40 mm or less is preferred.

Next, a glow plug equipped with a pressure sensor according to a second embodiment of the present invention will next be described with reference to FIGS. 4 and 5. A glow plug 301 of the present embodiment includes a substantially cylindrical housing 340 made of metal, a ceramic heater 410 which is located on the inside of the housing 340 and whose forward end (a lower end in FIG. 4) 410a protrudes from a forward end 343 of a forward end housing 342, a center shaft 330 disposed within the housing 340 in such a manner as to extend rearward from the rear end of the ceramic heater 410 and adapted to apply voltage, a pressure transmission tube 360 provided around the center shaft 330, and a distortion member 350 provided between the outer circumferential surface of a rear end portion of the pressure transmission tube 360 and the inner circumferential surface of the housing 340 and partially constituting a combustion pressure sensor.

In the present embodiment, the housing 340 includes a substantially cylindrical housing body 341 formed of, for example, SUS303, the forward end housing 342 fitted and welded to a forward end of the housing body 341 in a coaxially butted condition, and an intermediate housing 344 externally fitted and welded to a rear end portion of the housing body 341. The ceramic heater 410 has a circular columnar form and is disposed coaxially with the axial line G of the forward end housing 342 such that the forward end 410a protrudes from the forward end 343 of the forward end housing 342. As shown in FIG. 5, the ceramic heater 410 has a resistance heat-generating element (electrically conductive ceramic) 412 which is disposed in a ceramic substrate 411 (corresponding to a substrate appearing in claims) in such a manner as to be folded (U-shaped) at the forward end 410a and which has electrode lead-out portions 416 and 417 adapted to apply electricity and exposed at the side surface of a rear end portion of the ceramic heater 410. A holding sleeve 315 made of metal such as SUS630 is externally press-fitted to an intermediate portion of the ceramic heater 410 and is electrically connected, at the inner circumferential surface of its rear end portion, to the grounding electrode lead-out portion 416 located relatively forward. A metal elastic membrane (membrane) 418 (corresponding to a movable member appearing in claims) formed of a heat resisting Ni alloy such as stainless steel or INCONEL (registered trademark of INCO Corp.) is externally fitted to the holding sleeve 315 in a loose fit condition. The metal elastic membrane 418 is a thin sheet having a thickness of 0.3 mm; its rear end portion is welded, in a sealing condition, to the inner circumferential surface of a forward end portion of the forward end housing 342; and its forward end portion is welded, in a sealing condition, to the outer circumferential surface of the holding sleeve 515. The metal elastic membrane 418 allows a forward-rearward movement (displacement) of the heater 410 in relation to the housing 340, serves as a junctional electrically conductive member between the housing 340 and the grounding electrode lead-out portion 416, holds the heater 410 within the housing 340, and seals the interior of a forward end portion of the housing 340. The ceramic heater 410 and the metal elastic membrane 418 will be described in detail later.

The center shaft 330 for application of voltage is coaxially disposed on the rear end of the ceramic heater 410 and is disposed coaxially with the housing 340 in such a manner as to extend rearward with electrical insulation (air insulation in the present embodiment) being held within the housing 340. A connection pipe 319 of metal is externally fitted to a rear end portion of the ceramic heater 410 and to a forward end portion of the center shaft 330 by press fit or the like, and the electrode lead-out portion (positive-potential terminal) 417 located at a relatively rear position of the ceramic heater 410 maintains its electrical continuity through the inner circumferential surface of the connection pipe 319 and is thus electrically connected to the center shaft 330. That is, the connection pipe 319 unites the ceramic heater 410 and the center shaft 330 and ensures electrical continuity therebetween.

In the present embodiment, the housing 340 includes the housing body 341 and the forward end housing 342 and has a thread 346 formed in a predetermined length on the outer circumferential surface of the housing body 341 for threadingly fix the glow plug into a plug hole of an unillustrated engine head. The substantially cylindrical intermediate housing 344 is externally fitted to a rear end portion of the housing body 341; furthermore, a sealing protection tube (cap); i.e., a rear end housing 345 having the form of a different-diameter cylinder whose rear end portion is relatively small in diameter, is attached to the rear end of the intermediate housing 344 while the distortion member 350 for a sensor, which will be described later, is nipped at its outer circumferential portion therebetween. The distortion member 350 has an annular form (or a cylindrical form) as a whole and is fixed, at its inner circumferential portion, to the pressure transmission tube 360, which will be described in detail later.

In the present embodiment, the rear end of the center shaft 330 protrudes rearward from the rear end of the housing body 341 and is positioned in a forward end portion of a large-diameter tubular portion 363 of the rear end sealing protection tube (rear end housing) 345. A terminal metal member 375 having a plug terminal 373 protruding rearward into an ambient atmosphere is connected, by welding, to a rear end portion of the center shaft 330 via a terminal spring 371 which allows displacement in the forward-rearward direction within the rear end sealing protection tube 345. A seal member 369 formed of, for example, rubber is fitted into a rear end small-diameter portion 365 of the rear end sealing protection tube 345.

Next will be described a structure, among others, in which the distortion member 350, which partially constitutes a sensor for detection of pressure, and the pressure transmission tube 360 are fixed together. The forward end of the pressure transmission tube 360 is fixedly joined to a rear end portion of the holding sleeve 315. The pressure transmission tube 360 is provided in such a manner as to extend in the forward-rearward direction in a gap between the center shaft 330 and the housing body 341 while separating from the center shaft 330 and from the housing body 341. A rear end portion of the pressure transmission tube 360 is disposed within the intermediate housing 344, and the inner circumferential surface of the distortion member 350 is joined to the outer circumferential surface of the rear end portion of the pressure transmission tube 360.

The distortion member 350 is disposed at the rear end of the intermediate housing body 344 in such a manner as to block, with respect to the forward-rearward direction, an annular space between the inside of a rear end portion of the intermediate housing 344 and the outer circumferential portion of a rear end portion of the pressure transmission tube 360, and has an annular form (cylindrical form) as a whole. The distortion member 350 is provided so as to be deformed simultaneously with reception, by the pressure transmission tube 360, of a forward-rearward movement of the ceramic heater 410. Specifically, the distortion member 350 has an annular thick portion 352a at its outer circumference; the annular thick portion 352a is fitted, in a butting condition, to the rear end of the intermediate housing 344 and to the forward end of the sealing protection tube (rear end housing) 345 located rearward of the intermediate housing 344 while being sandwiched between the rear end and the forward end; and each of the butt portions is fixed through laser welding performed along the circumferential direction from outside.

Meanwhile, the distortion member 350 has an outer tubular portion 352 extending rearward (upward in FIG. 2) at the inside of the annular thick portion 352a formed at the outer circumference, and an annular membrane portion (annular diaphragm portion) 355 located at the inside of the rear end of the outer tubular portion 352. The distortion member 350 further has an inner tubular portion 351 extending forward at the inside (on a side toward the inner circumference) of the annular membrane portion 355. The inner tubular portion 351 extends forward beyond the position of the annular thick portion 352a formed at the outer circumference.

Furthermore, an appropriate number of strain sensors (corresponding to a pressure sensor appearing in claims) 320 are attached to, for example, a rearward-oriented surface of the annular membrane portion (annular diaphragm portion) 355 of the distortion member 350, and the strain sensors 320 detect, via a device including an unillustrated circuit, strain on the basis of deformation of the distortion member 350 which is deformed upon reception of a forward-rearward movement of the pressure transmission tube 360, and output an electric signal according to the detected strain through unillustrated output lead-out electric wires. Thus, the glow plug 301 of the present embodiment is configured as follows: the heater 410 and the pressure transmission tube 360 unitarily move forward or rearward in the direction of the axial line G in response to combustion pressure and thereby deform the distortion member 350, and combustion pressure is detected from the deformation of the distortion member 350 by use of the strain sensors 320.

Next will be described the ceramic heater 410 and the metal elastic membrane (membrane) 418, which are essential members of the present invention.

Figure 4:
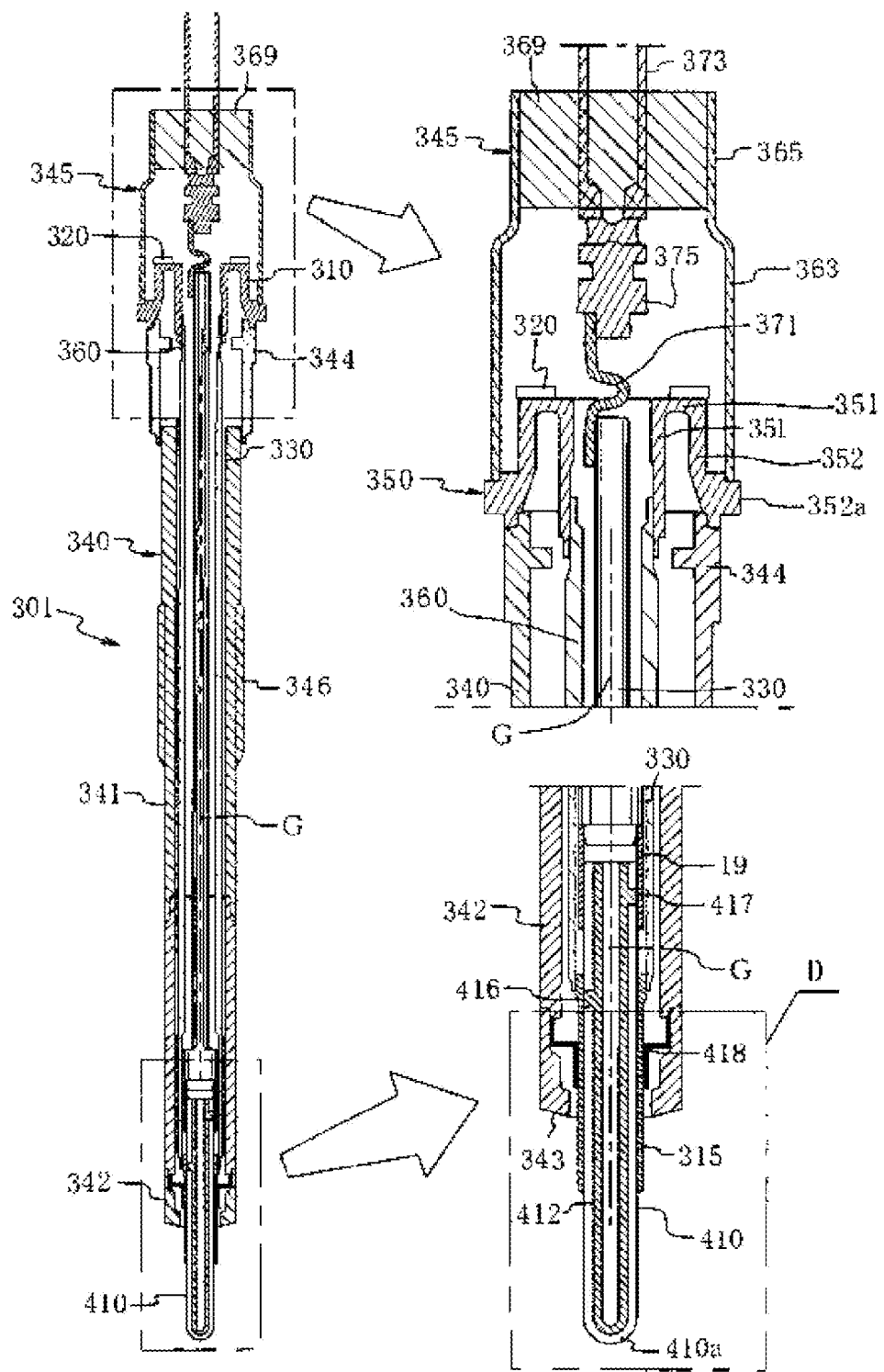
FIG. 4 Longitudinal sectional view of a glow plug equipped with a pressure sensor according to an embodiment (second embodiment) of the present invention and enlarged views of forward and rearward end portions of the glow plug.
Figure 5:
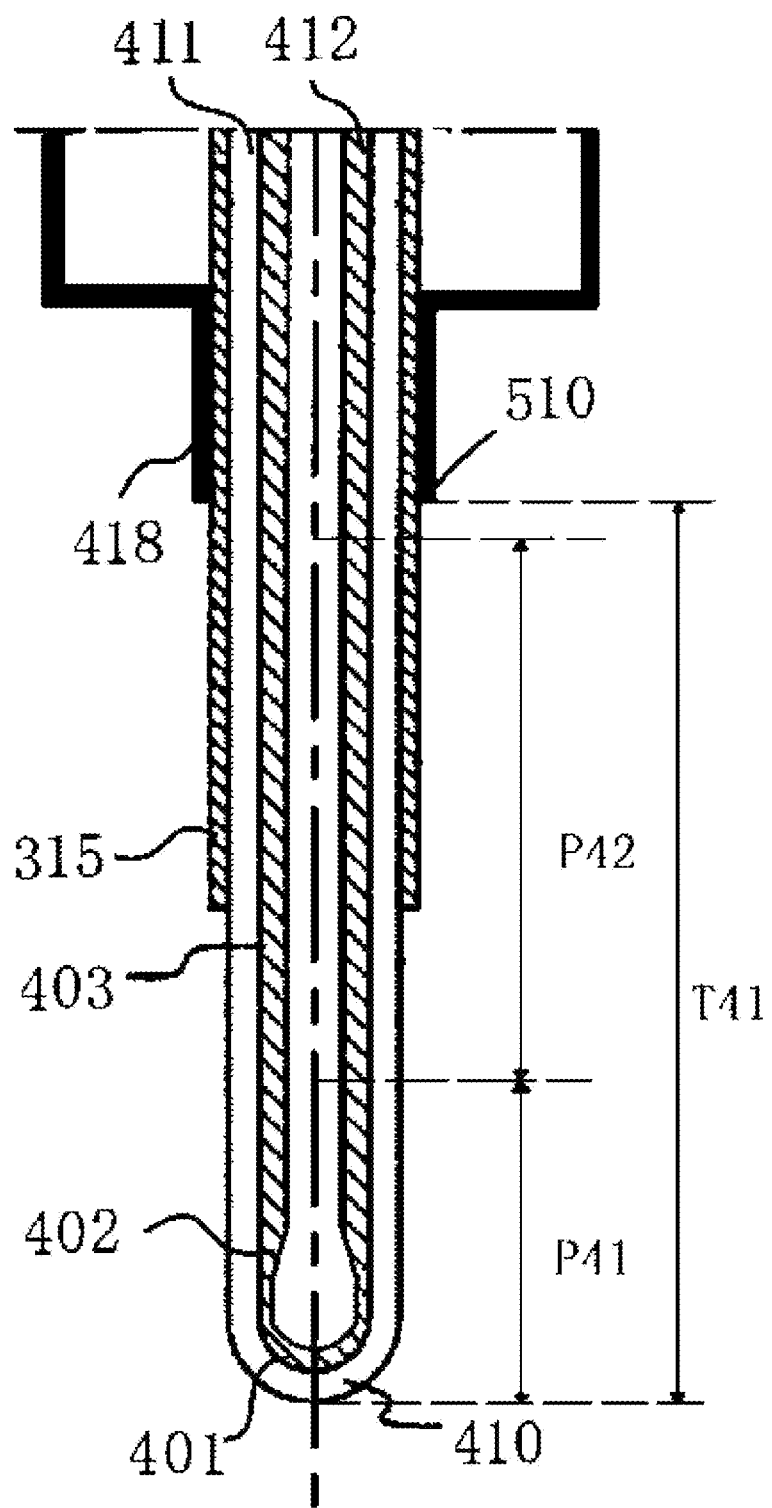
FIG. 5 Enlarged view of region D of the forward end portion of the glow plug equipped with a pressure sensor shown in FIG. 4.

FIG. 5 is an enlarged view of region D of a forward end portion of the glow plug 301 shown in FIG. 4; however, for convenience of description, the forward end housing 342 is omitted.

Since the ceramic heater 410 is similar to the ceramic heater 10 of the first embodiment, description thereof is omitted or briefed.

Similar to the first embodiment, the ceramic heater 410 is configured such that the resistance heat-generating element 412 formed of an electrically conductive ceramic of tungsten carbide is disposed in a shape resembling the letter U in the ceramic substrate 411 formed of silicon nitride. The resistance heat-generating element 412 has a shape resembling the letter U and has, sequentially from its forward end, a small-diameter line portion 401 having a circular cross section of 0.5 mm in diameter, a pair of taper portions 402, and a pair of large-diameter line portions 403 each having a circular cross section (or an elliptic cross section) of 0.9 mm in diameter. As shown in FIG. 4, the large-diameter line portions 403 have the electrode lead-out portions 416 and 417, respectively, having, for example, a circular columnar shape and formed in a protruding manner.

The ceramic heater 410 is configured also such that its forward end portion intensively generates heat at high temperature; specifically, as shown in FIG. 5, a heat-generating main portion P41 whose resistance (e.g., 300 mΩ) is 75% of the total resistance (e.g., 400 mΩ) of the ceramic heater 410 is intensively disposed at a forward end portion of the ceramic heater 410 (e.g., when the entire ceramic heater 410 is divided into three equal portions from its forward end, the heat-generating main portion P41 is disposed within the forwardmost portion among the three portions). As a result, the heat-generating main portion P14 can be positioned forward of the forward end of the holding sleeve 315. Thus, a forward end portion of the ceramic heater 410 can efficiently and intensively generate heat at high temperature.

A specific method of disposing the heat-generating main portion P41 intensively at a forward end portion is as follows: as mentioned above, the resistance heat-generating element 412 is formed only of electrically conductive ceramic of tungsten carbide, and the resistance heat-generating element 412 is provided with the small-diameter line portion 401 smaller in cross-sectional area than the large-diameter line portions 403, whereby the resistance of a forward end portion of the ceramic heater 10 is further increased.

Furthermore, a heat-generating sub portion P42 is provided in such a manner as to be connected to the heat-generating main portion P41. The heat-generating sub portion P42 is a portion whose resistance plus resistance of the heat-generating main portion P41 is 80% (e.g., 320 mΩ) of the total resistance of the ceramic heater 410. That is, the heat-generating portion P2 is a portion whose resistance is 5% of the total resistance of the ceramic heater 410. A rear portion of the heat-generating sub portion P42 is disposed in the interior of the holding sleeve 315.

As shown in FIG. 5, the axial length of the heat-generating sub portion P42 is rendered longer than the axial length of the heat-generating main portion P41. In the present embodiment, the axial length of the heat-generating main portion P41 is 7.5 mm, and the axial length of the heat-generating sub portion P42 is 12.5 mm. By means of the axial length of the heat-generating sub portion P42 being longer than the axial length of the heat-generating main portion P41, in the course of rearward propagation of heat from the heat-generating main portion P41 via the heat-generating sub portion P42, heat can be further radiated from the ceramic heater 410 to an engine head and to a plug hole. As a result, a portion of the ceramic heater 410 located rearward of the heat-generating sub portion P42 can have relatively low temperature.

Furthermore, as mentioned above, the holding sleeve 315 is externally press-fitted to an intermediate portion of the ceramic heater 410, and the metal elastic membrane (membrane) 418 is welded to the holding sleeve 315. Incidentally, since the metal elastic membrane 418 is, for example, a thin sheet having a thickness of 0.3 mm, the quantity of heat transferred through the metal elastic membrane 418 is relatively small. Thus, the heat transfer path which extends from the ceramic heater 410, via the metal elastic membrane 418, to the housing 340 and then to the engine head is extremely limited in heat transfer as compared with a glow plug having a conventional structure, potentially resulting in adverse effect on joining strength at a joint part 510. By contrast, in the present embodiment, the joint part 510 between the holding sleeve 315 and the metal elastic membrane 418 is located rearward of the heat-generating sub portion P42. Thus, the influence of heat on the joint part 510 between the holding sleeve 315 and the metal elastic membrane 418 can be reduced, whereby deterioration in joining strength at the joint part 510 can be restrained. As a result, there can be restrained damage to the ability to function as a pressure sensor resulting from deterioration in airtightness with respect to combustion gas.

Also, in the present embodiment, the joint part 510 is positioned in the interior of the housing 340 (see FIG. 1). In this manner, while the heat-generating main portion P31 is disposed forward of the holding sleeve 315, the joint part 510 is positioned in the interior of the housing 340, whereby the longitudinal distance between the heat-generating main portion P41 and the joint part 510 is increased, and the metallic shell surrounds a portion of the ceramic heater located between the heat-generating main portion and the joint part; thus, heat propagating rearward from the heat-generating main portion P41 can be further radiated from the ceramic heater 10 to the engine head and the plug hole in the course of propagation to the joint part 510. Thus, the influence of heat on the joint part 510 between the holding sleeve 315 and the metal elastic membrane 418 can be further reduced, whereby deterioration in joining strength can be further restrained. As a result, there can be restrained damage to the ability to function as a pressure sensor resulting from deterioration in airtightness with respect to combustion gas.

Furthermore, in the present embodiment, silicon nitride used to form the ceramic substrate 411 has a thermal conductivity of 17 W/m° C. at 1,350° C., and tungsten carbide used to form the resistance heat-generating element 412 has a thermal conductivity of 22.5 W/m° C. at 1,350° C. In this manner, if the ceramic substrate 411 or the resistance heat-generating element 412 has a thermal conductivity of 15 W/m° C. or more at 1,350° C., there is relatively facilitated propagation of heat from the heat-generating main portion P41 of the ceramic heater 410 to a rear portion where the joint part 510 is provided. In this connection, in the present embodiment, a distance T41 from the forward end of the heat-generating main portion P41 (i.e., the forward end of the ceramic heater 410) to the joint part 510 is 24 mm. Since the axial distance from the forward end of the heat-generating main portion P41 to the joint part 510 is 24 mm or more, the heat-generating sub portion P42 can have a relatively long axial length. Therefore, heat propagating rearward from the heat-generating main portion P41 can be effectively radiated to the engine head and the plug hole in the course of propagation via the heat-generating sub portion P42. As a result, the joint part 510 located rearward of the heat-generating sub portion P42 of the ceramic heater 410 can be further reduced in temperature, whereby deterioration in joining strength at the joint part 510 can be further restrained. Notably, the longer the axial distance from the forward end of the heat-generating main portion P41 to the joint part 510, the more the axial length of the heat-generating sub portion P42 can be increased, whereby heat can be more effectively radiated; however, when the axial distance from the forward end of the heat-generating main portion P41 to the joint part 510 exceeds 40 mm, the temperature raising performance drops; therefore, an axial distance of 40 mm or less is preferred.

Next, a glow plug equipped with a pressure sensor according to a third embodiment of the present invention will next be described with reference to FIG. 6. A glow plug 701 of the third embodiment differs from the glow plug 101 of the first embodiment only in the configuration of the ceramic heater; thus, in the following description, parts related to the ceramic heater are described in detail, and descriptions of other parts are briefed or omitted. In the following description, parts similar to those of the glow plug 101 of the first embodiment are denoted by like reference numerals.

Figure 6:
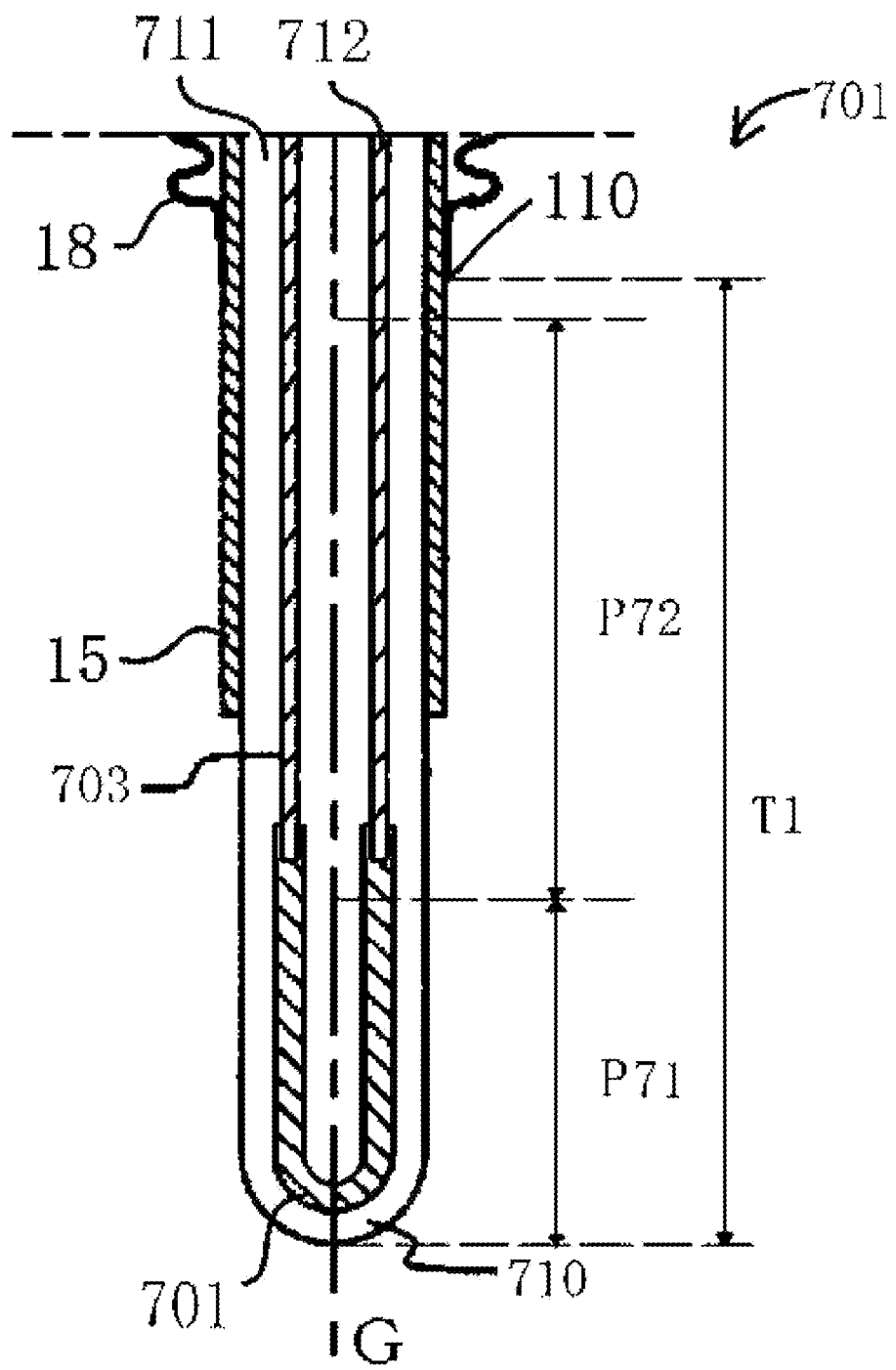
FIG. 6 Enlarged view of a forward end portion of a glow plug equipped with a pressure sensor according to an embodiment (third embodiment) of the present invention.

As shown in FIG. 6, different from the ceramic heater 10 of the first embodiment, a ceramic heater 710 is configured such that a resistance heat-generating element 712 is disposed in a shape resembling the letter U in a forward end portion of a ceramic substrate 711 formed of silicon nitride and extends toward the rear side of the substrate 711. The resistance heat-generating element 712 has a shape resembling the letter U and is composed of a forward end portion 701 which includes a fold at the forward end (lower end in FIG. 3) corresponding to a bottom portion of the letter U, and two lead portions 703 connected to the forward end portion. The forward end portion 701 has a substantially elliptic cross section, and the percentage of the cross-sectional area (the total cross-sectional area of the forward end portion 701) of the forward end portion 701 to the cross-sectional area of the ceramic heater 710 is 12%. The lead portions 703 each have a substantially circular cross section, and the percentage of the total cross-sectional area of the lead portions 703 to the cross-sectional area of the ceramic heater 710 is 18%. That is, the cross-sectional area of the forward end portion 701 and the cross-sectional area of the lead portions 703 are approximately equal to each other.

The forward end portion 701 is formed of nitride ceramic, whereas the lead portions 703 are formed of tungsten. That is, the specific resistance (20 μΩcm) of the forward end portion 701 is rendered greater than the specific resistance (5 μΩcm) of the lead portions. Material for the ceramic substrate 711 is not limited to silicon nitride; instead, alumina, sialon, etc., can be used. Also, material for the forward end portion 701 is not limited to nitride ceramic; for example, any one of silicon nitride ceramic, sialon, and aluminum nitride ceramic may be used singly; alternatively, at least one of silicon nitride ceramic, sialon, and aluminum nitride ceramic can be used as a main component. Furthermore, material for the lead portions 703 is not limited to tungsten; instead, a metal (e.g., tantalum) can be used.

In consideration of disposing a forward end portion of the ceramic heater 710 in a combustion chamber of an engine for heating the combustion chamber, the ceramic heater 710 is configured such that its forward end portion intensively generates heat at high temperature. Specifically, as shown in FIG.

6, a heat-generating main portion P71 whose resistance (e.g., 300 mΩ) is 75% of the total resistance (e.g., 400 mΩ) of the ceramic heater 710 is intensively disposed at a forward end portion of the ceramic heater 710 (e.g., when the entire ceramic heater 710 is divided into three equal portions from its forward end, the heat-generating main portion 7P1 is disposed within the forwardmost portion among the three portions). As a result, the heat-generating main portion P71 can be positioned forward of the forward end of the holding sleeve 15. Thus, a forward end portion of the ceramic heater 710 can efficiently and intensively generate heat at high temperature.

A specific method of disposing the heat-generating main portion P71 intensively at a forward end portion is as follows: as mentioned above, the cross-sectional area of the forward end portion 701 and the cross-sectional area of the lead portions 703 are rendered approximately equal to each other, and the lead portions 703 are rendered greater in specific resistance than the forward end portion 701, whereby the resistance of a forward end portion of the ceramic heater 710 is further increased.

Furthermore, a heat-generating sub portion P72 is provided in such a manner as to be connected to the heat-generating main portion P71. The heat-generating sub portion P72 is a portion whose resistance plus resistance of the heat-generating main portion P71 is 80% (e.g., 320 mΩ) of the total resistance of the ceramic heater 10. That is, the heat-generating portion P72 is a portion whose resistance is 5% of the total resistance of the ceramic heater 710. By means of provision of the lead portions 703 in the resistance heat-generating element 712 as mentioned above, the heat-generating sub portion P72 can be a portion whose resistance is 5% of the total resistance of the ceramic heater 710. A rear portion of the heat-generating sub portion P72 is disposed in the interior of the holding sleeve 15.

As shown in FIG. 6, the axial length of the heat-generating sub portion P72 is rendered longer than the axial length of the heat-generating main portion P71. In the present embodiment, the axial length of the heat-generating main portion P71 is 7.5 mm, and the axial length of the heat-generating sub portion P72 is 12.5 mm. By means of the axial length of the heat-generating sub portion P72 being longer than the axial length of the heat-generating main portion P71, in the course of rearward propagation of heat from the heat-generating main portion P71 via the heat-generating sub portion P72, heat can be further radiated from the ceramic heater 710 to an engine head and to a plug hole. As a result, a portion of the ceramic heater 10 located rearward of the heat-generating sub portion P72 can have relatively low temperature.

Furthermore, as mentioned above, the holding sleeve 15 is externally press-fitted to an intermediate portion of the ceramic heater 710, and the bellows 18 made of metal is welded to the holding sleeve 15. Incidentally, since the bellows 18 is of, for example, a membrane having a thickness of 0.07 mm, the quantity of heat transferred through the bellows 18 is relatively small. Thus, the heat transfer path which extends from the ceramic heater 710, via the bellows 18, to the forward end housing 50 and then to the engine head is extremely limited in heat transfer as compared with a glow plug having a conventional structure, potentially resulting in adverse effect on joining strength at a joint part 110. By contrast, in the present embodiment, the joint part 110 between the holding sleeve 15 and the bellows 18 is located toward the rear end of the ceramic heater 710. Thus, the influence of heat on the joint part 110 between the holding sleeve 15 and the bellows 18 can be reduced, whereby deterioration in joining strength at the joint part 110 can be restrained. As a result, there can be restrained damage to the ability to function as a pressure sensor resulting from deterioration in airtightness with respect to combustion gas.

Also, in the present embodiment, the joint part 110 is positioned in the interior of the housing 40 (see FIG. 1). In this manner, while the heat-generating main portion P71 is disposed forward of the holding sleeve 15, the joint part 110 is positioned in the interior of the housing 40, whereby the longitudinal distance between the heat-generating main portion P71 and the joint part 110 is increased, and the metallic shell surrounds a portion of the ceramic heater located between the heat-generating main portion and the joint part; thus, heat propagating rearward from the heat-generating main portion P71 can be further radiated from the ceramic heater 710 to the engine head and the plug hole in the course of propagation to the joint part 110. Thus, the influence of heat on the joint part 110 between the holding sleeve 15 and the bellows 18 can be further reduced, whereby deterioration in joining strength can be further restrained. As a result, there can be restrained damage to the ability to function as a pressure sensor resulting from deterioration in airtightness with respect to combustion gas.

EXAMPLES

Figure 7:
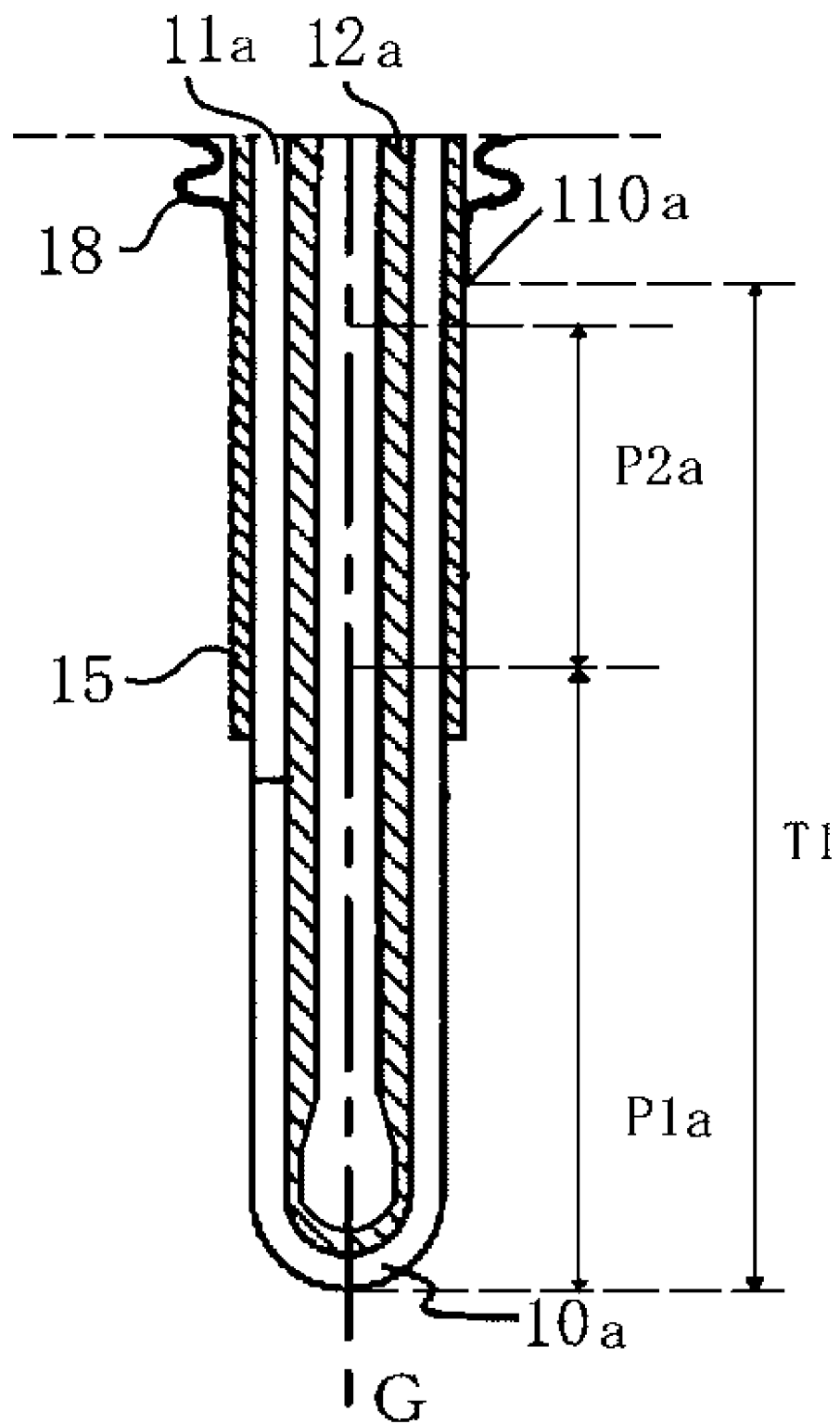
FIG. 7 Enlarged view (corresponding to FIG. 3) of a glow plug equipped with a pressure sensor of a comparative example.

The temperatures of the joint parts 110 and 110a were measured with respect to the glow plug 101 of an example having the configuration described above in the section of the first embodiment and a glow plug 101a of a comparative example which differed from the glow plug 101 of the first embodiment in the axial length of a heat-generating main portion P1a and the axial length of a heat-generating sub portion P2a as shown in FIG. 7. Similar to FIG. 3, FIG. 7 shows only a ceramic heater 110a, the holding sleeve 15, and the bellows 18.

As mentioned above, in the glow plug 101 of the example, the axial length of the heat-generating main portion P1 was set to 7.5 mm, and the axial length of the heat-generating sub portion P2 was set to 12.5 mm; furthermore, the axial distance from the forward end of the ceramic heater 10 to the joint part 110 was set to 24 mm. In the glow plug 101a of the comparative example, the axial length of the heat-generating main portion P1a was set to 15 mm, and the axial length of the heat-generating sub portion P2a was set to 5 mm; furthermore, the axial distance T1 from the forward end of the ceramic heater 10a to the joint part 110a was set to 24 mm. That is, the example and the comparative example had the same position of the rear ends of the heat-generating sub portions P2 and P2a and the same axial distance T1.

In the glow plug 10a of the comparative example, the axial lengths of the heat-generating main portion P1a and the heat-generating sub portion P2a can be changed from those of the glow plug 10 of the example by changing material for the electrically conductive ceramic and changing the cross-sectional area of the electrically conductive ceramic. Material for the electrically conductive ceramic may be changed by using a single material or combining a plurality of materials.

Furthermore, the ceramic substrates 11 and 11a had a diameter of 3.1 mm; the holding sleeves 15 and 15a had a thickness of 0.45 mm; and the bellows 18 had a thickness of 0.07 mm.

The glow plugs 101 and 101a of the example and the comparative example, respectively, were heated under electricity application control such that a temperature of 1,000° C. was reached in two seconds, and subsequently, a temperature of 1,350° C. was reached; two minutes later, the temperatures of the joint parts 110 and 110a were measured by means of a thermocouple. As a result, the temperature of the joint part 110 of the glow plug 101 of the example was 570° C., whereas the temperature of the joint part 110a of the glow plug 101a of the comparative example was 690° C. In this manner, by means of the axial length of the heat-generating sub portion P2 being longer than the axial length of the heat-generating main portion P1, heat can be radiated to the engine head and the plug hole through the heat-generating sub portion P2, whereby temperature at the joint part 110 can be reduced. Since the bellows 18 is formed of a heat resisting Ni alloy, it is preferred to control the temperature of the weld 110 of the bellows 18 to 600° C. or less at which deterioration in welding strength of the bellows 18 does not arise; from this point of view, also, the glow plug 101 of the example is found to be preferred.

Next, the above-mentioned glow plug 101 of the first embodiment was evaluated for joining strength of the weld 110 in the case where the axial distance from the forward end of the ceramic heater 110 to the weld 110 was varied.

Specifically, there were prepared four glow plugs 101 in which the axial distance from the forward end of the ceramic heater 110 to the weld 110 was 20 mm, 22 mm, 24 mm, and 26 mm, respectively. In the glow plugs 101 of the example, the heat-generating main portion P1 had an axial length of 7.5 mm; the heat-generating sub portion P2 had an axial length of 12.5 mm; the ceramic substrate 11 was formed of silicon nitride; the resistance heat-generating element 12 was formed of tungsten carbide; the holding sleeve 15 was formed of SUS316; and the bellows 18 was formed of a heat resisting Ni alloy.

Furthermore, the ceramic substrate 11 had a diameter of 3.1 mm; the holding sleeve 15 had a thickness of 0.45 mm; and the bellows 18 had a thickness of 0.07 mm.

The four glow plugs 101 were placed in an atmosphere having a temperature of 450° C.; while the element forward-end temperature was held at 1,350° C. (maximum temperature of the heat-generating main portion P1), the ceramic heater 110 was vibrated in the vertical direction of FIG. 3; and the number of vibration cycles up to rupture of the bellows 18 was measured. One vibration cycle consists of application of a pressure of 300 N (21 MPa) to the forward end of the ceramic heater 110 and subsequent release of the pressure.

As a result, in the glow plug 100 in which the axial distance from the forward end of the ceramic heater 110 to the weld 110 was 20 mm, rupture occurred at $2 \times 10^7$ cycles; in the glow plug 100 in which the axial distance was 22 mm, rupture occurred at $3 \times 10^7$ cycles; and in the glow plug 100 in which the axial distance was 24 mm, rupture occurred at $2 \times 10^8$ cycles. In the glow plug 100 in which the axial distance was 26 mm, the bellows 18 did not rupture even after vibration was applied at $1 \times 10^9$ cycles. In this manner, by means of the axial distance from the forward end of the ceramic heater 110 to the weld 110 being 24 mm or more, deterioration in joining strength at the joint part 110 can be further restrained.

The present invention is not limited to the embodiments described above, but may be embodied in appropriately modified forms. For example, in the first embodiment described above, the distortion member has a shape or structure such that, in a longitudinal section, a radial one side is folded at the rear side; however, no particular limitation is imposed on the distortion member so long as the distortion member deforms according to a forward-rearward movement of the heater generated by the heater being pressed rearward at its forward end by combustion pressure, and the sensor can detect the combustion pressure from the deformation; therefore, there may be employed an appropriate shape or structure such as a mere diaphragm (membrane) in the form of an annular plate. Also, in the first and second embodiments described above, a strain gauge is used as a sensor; however, there may be used various sensors (sensor elements), such as a semiconductor strain gauge in the form of a semiconductor equipped with a piezoresistor, and a piezoelectric element. Furthermore, in the first and second embodiments described above, the distortion member is disposed between the rear end of the housing body and a portion of the center shaft located toward the rear end of the center shaft; however, the distortion member may be provided between the housing and the center shaft at their intermediate portions with respect to the forward-rearward direction. According to description of the glow plug of the first embodiment, a rear end portion of the bellows is welded, in a sealing condition, to the inner circumferential surface of a forward end portion of the forward end housing; however, a rear end portion of the bellows is nipped, followed by welding, in a joint between the rear end of the forward end housing and the forward end of the housing body (between the butt ends).

DESCRIPTION OF REFERENCE NUMERALS 101, 301, 701: glow plug
10, 410, 710: ceramic heater
11 411, 711: ceramic substrate
12, 412, 712: resistance heat-generating element
15, 315: holding sleeve
18: bellows
210, 350: distortion member
220, 320: strain sensor
30, 330: center shaft
40, 340: housing
418: metal elastic membrane (membrane)
P1, P41, P71: heat-generating main portion
P2, P42, P72: heat-generating sub portion
110, 510: joint part

The invention claimed is:

1. A glow plug equipped with a pressure sensor comprising:
a ceramic heater extending in an axial direction and having a columnar substrate formed of electrically insulating ceramic, a resistance heat-generating element integrated with the substrate and performing resistance heat generation through application of electricity thereto, and an electrode lead-out portion electrically connected to the resistance heat-generating element and formed at a rear end portion of the resistance heat-generating element in such a manner as to be exposed at an outer surface of the substrate;
a holding sleeve made of metal, connected directly or indirectly to the electrode lead-out portion, and holding the ceramic heater while allowing a forward portion of the ceramic heater to protrude therefrom;
a housing having a tubular form and accommodating therein the ceramic heater and the holding sleeve;
a movable member formed of a metal sheet, joined to the holding sleeve and the housing to airtightly separate a forward side and a rear side thereof, and being elastically deformable in response to combustion pressure; and
a pressure sensor disposed rearward of the ceramic heater, the holding sleeve, and the movable member and in the interior of the housing and adapted to detect pressure applied thereto;
the glow plug being characterized in that a heat-generating main portion is located forward of the holding sleeve, where the heat-generating main portion is a forward end portion of the ceramic heater which encompasses a forward end of the ceramic heater and whose resistance accounts for 75% of a total resistance of the ceramic heater;

the heat-generating main portion is shorter in axial length than a heat-generating sub portion, where the heat-generating sub portion is a portion of the ceramic heater extending further rearward from a rear end of the heat-generating main portion, and the sum of the resistance of the heat-generating sub portion and the resistance of the heat-generating main portion is 80% of the total resistance; and the joint part between the holding sleeve and the movable member is located rearward of the heat-generating sub portion.

2. The glow plug according to claim 1, wherein a joint part between the holding sleeve and the movable member is located in the interior of the housing.

3. The glow plug according to claim 1, wherein the heat-generating resistor in the heat-generating main portion has a specific resistance which is 90% to 110% of that of the heat-generating resistor in a portion other than the heat-generating main portion, and the heat-generating resistor in the heat-generating main portion is smaller in cross-sectional area than the heat-generating resistor in a portion other than the heat-generating main portion.

4. The glow plug according to claim 1, wherein the cross-sectional area of the heat-generating resistor in the heat-generating main portion is 90% to 110% of the cross-sectional area of the heat-generating resistor in a portion other than the heat-generating main portion, and the heat-generating resistor in the heat-generating main portion is greater in specific resistance than the heat-generating resistor in a portion other than the heat-generating main portion.

5. The glow plug according to claim 1, wherein the electrically insulating ceramic or the resistance heat-generating element has a thermal conductivity of 15 W/m° C. or more at 1,350° C., and an axially shortest distance from a forward end of the heat-generating main portion to the joint part between the holding sleeve and the movable member is 24 mm or more.

* * * * *